(No Model.)
L. B. WELLS.
APPARATUS FOR TAKING THE END THRUST OF SHAFTS.
No. 366,748. Patented July 19, 1887.
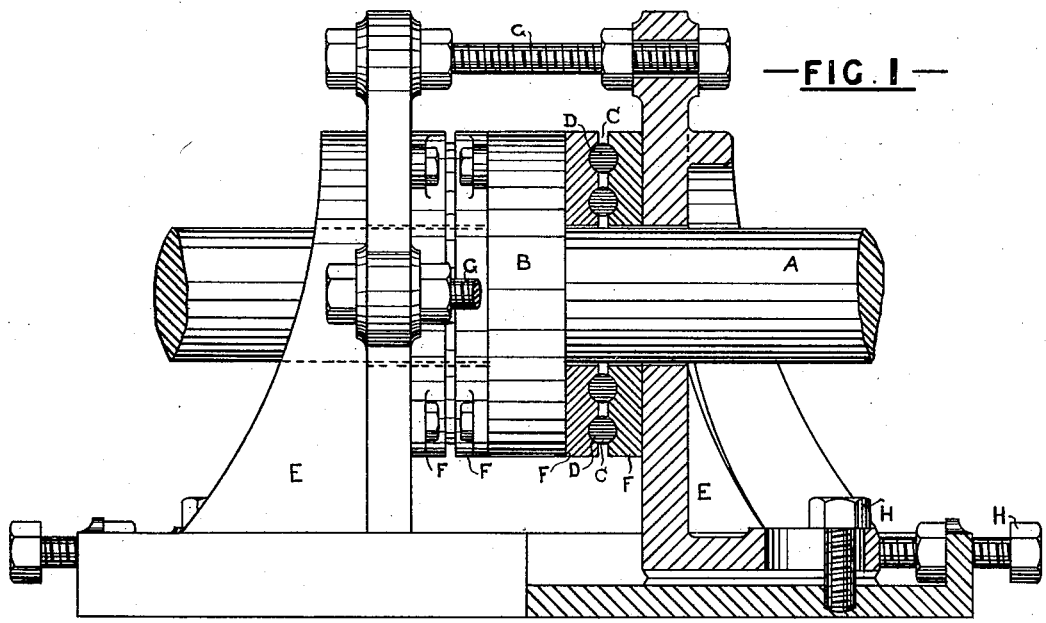
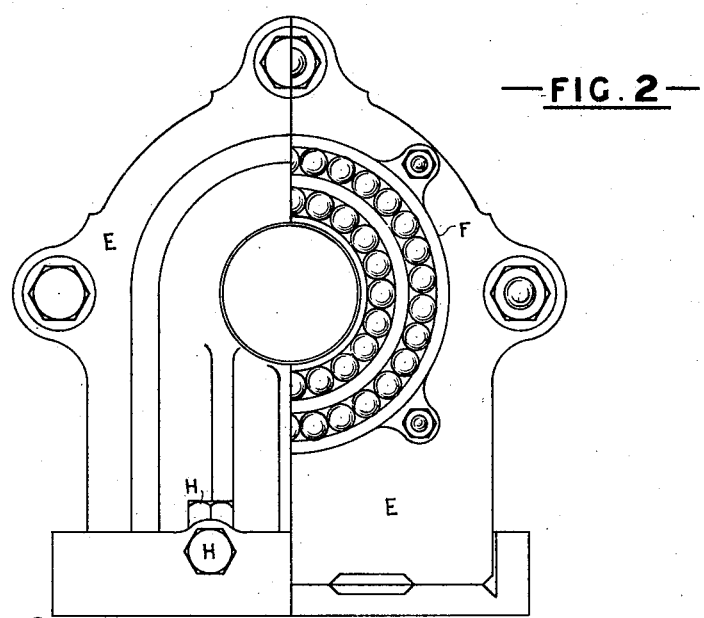

UNITED STATES PATENT OFFICE.

LIONEL BURY WELLS, OF NORTHWICH, COUNTY OF CHESTER, ENGLAND.

APPARATUS FOR TAKING THE END-THRUST OF SHAFTS.

SPECIFICATION forming part of Letters Patent No. 366,748, dated July 19, 1887.

Application filed December 15, 1885. Serial No. 185,749. (No model.) Patented in England August 18, 1884, No. 11,397.

*To all whom it may concern:*

Be it known that I, LIONEL BURY WELLS, civil engineer, a subject of the Queen of Great Britain, of Northwich, in the county of Chester, England, have invented a new and useful Improvement in Apparatus and Arrangements for Taking the Thrust of Shafting in Motion, (for which I have obtained a patent in Great Britain, No. 11,397, bearing date August 18, 1884,) of which the following is a specification.

My invention relates to improvements in apparatus and arrangements for taking the thrust of rotary or rotating shafts against or by moving or movable parts or surfaces in place of fixed or stationary ones, and thus diminish friction, arranged so as to receive the thrust, in whichever direction the engine or engines may be moving, and provided with suitable means of adjustment for taking up the wear caused by use; and I attain these objects, first, by the use of balls or spheres arranged as shown; second, by the movable contact with the balls or spheres; third, by the use of movable bearing parts on the shaft and fixed portions, between which the balls or spheres work. I attain these objects by the mechanism illustrated with accompanying drawings, in which—

Figure 1 is a longitudinal view, partly in section. Fig. 2 is an end elevation, one side or part of the piece E being removed to show the two (or more or less) rows of balls, spheres, or moving or movable parts.

Similar letters refer to similar parts throughout the several views.

The shaft A is provided with an enlarged part, B, (in the case of a screw-propeller, where disk-couplings are used on the shafts, the same may be adapted for the purpose,) on which one or more grooves or recesses are formed to contain the anti-friction spheres or balls C C, or these grooves or recesses D D may be formed in a harder metal, arranged so as to be easily attached to the enlarged part, and also on or to the fixed part of the bearing, as shown at E E in the accompanying drawings. The fixed bearing parts F F are made so as to be placed over the shaft and adjusted to and kept in their desired positions by the adjustable distance-pieces G G and screws and bolts H H.

In the case of screw-propellers, in place of concentrating the thrust of the screw at one part of the shafting, as is now done in the ordinary thrust-block arrangement, I propose to apply this anti-frictional arrangement at each point where a bearing is used to support the shaft, or, in the case of new engines or ships, to fit bearings to allow of this being done. By this means the propelling power will be more evenly distributed through the length of shafting, and also over the hull of the ship.

I am aware that anti-friction rollers, balls, spheres, or movable parts have long been known and used for diminishing friction, both under and against the rubbing-surfaces, so I therefore do not claim such devices broadly; but What I do claim as my invention, and desire to secure by Letters Patent, is—

The combination of the shaft A, having the disk B, the anti-friction balls or spheres C, the bearing-plates F, provided with the grooves D, the adjustable standards E, the adjustable screw-bolts G, and the adjusting-screws H, all substantially as described.

LIONEL BURY WELLS.

Witnesses:
    WILL. W. KIRKMAN,
*Solicitor, Manchester, England.*
    GEO. W. BROWN,
*Clerk with E. Butler Rowley, Notary Public,
2 Booth Street, Manchester.*